UNITED STATES PATENT OFFICE.

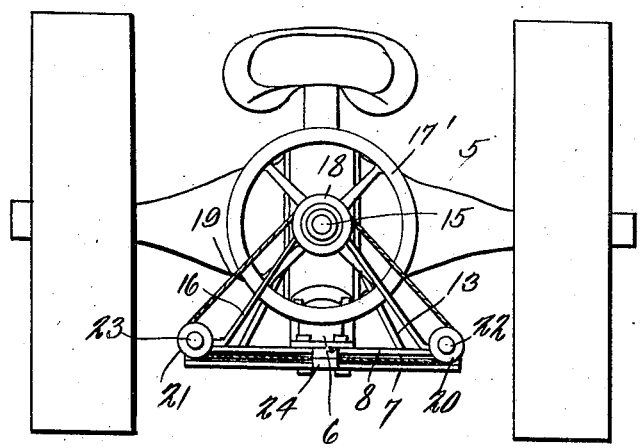
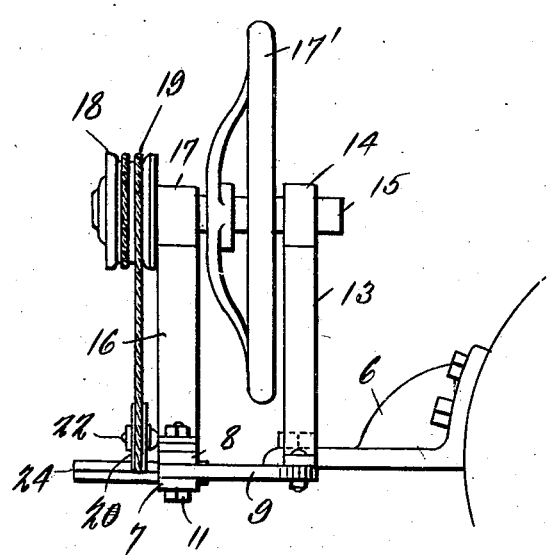
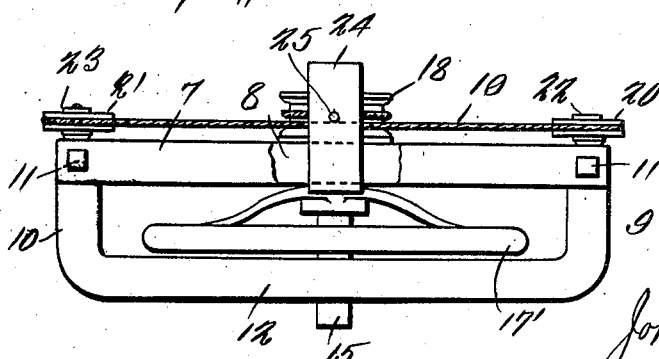

JOHN F. WINGERT, JR., OF BRADY TOWNSHIP, CLEARFIELD COUNTY, PENNSYLVANIA.

TRACTOR-COUPLING.

1,342,011.    Specification of Letters Patent.    Patented June 1, 1920.

Application filed August 25, 1919. Serial No. 320,966.

*To all whom it may concern:*

Be it known that I, JOHN F. WINGERT, Jr., a citizen of the United States of America, and resident of Brady township, county of Clearfield, and State of Pennsylvania, have invented certain new and useful Improvements in Tractor-Couplings, of which the following is a specification.

This invention relates to an adjustable connection or hitch primarily adapted for use in connection with a Fordson tractor.

An object of this invention is to provide novel means whereby a trailer or plow or other device can be connected to the tractor, novel means being provided for adjusting the line of pull so that the plow or trailer can be caused to travel in different lines with respect to the direction of travel of the tractor; that is to say, the hitch may be so regulated as to exert a pull toward the left of the tractor or toward the right or to positions between the same.

A still further object of this invention is to produce a driving connection provided with novel means for manipulating the adjusting mechanism without the employment of undue power.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views and in which—

Figure 1 illustrates rear view of the tractor with the device embodying the invention applied thereto;

Fig. 2 illustrates side elevation with the wheels removed; and

Fig. 3 illustrates underneath plan view of the hitch and the controlling device.

In these drawings 5 denotes the shaft or gear case of the tractor, 6 a bracket or platform extending from the gear case, to which the frame of the controlling device is attached.

The frame comprises two parallel plates 7 and 8 between which the side bars 9 and 10 are attached by the fastenings 11, such as bolts. The side bars 9 and 10 have their ends connected to a plate 12, and the plate 12 is attached to the bracket 6.

A bracket 13 is supported by the frame and has a journaled bearing 14 in which the shaft 15 is rotatable. A bracket 16 is also supported by the frame and it has a journaled bearing 17 in which the said shaft is rotatable.

A hand wheel 17' is secured to the shaft and is used for manipulating the said shaft for adjusting the parts as will presently appear.

A pulley 18 is connected to the shaft and a flexible member such as a cable 19 is wound therearound, the said cable being further engaged by sheave pulleys 20 and 21 journaled on studs 22 and 23, respectively, which are carried by the frame, and the said cable when operated communicates motion to the coupling 24 which may be attached to a plow beam, trailer, or the like. Only a conventional form of coupling is shown, as it is apparent that any hitch may be employed at this point. It is guided between the plates 7 and 8 and the said plates serve to prevent tilting of the coupling bar or pole leading from the plow or trailer. A pin 25 may be employed for connecting the coupling to the flexible member so that the motion of the said flexible member may cause the coupling to slide transversely of the frame for purposes heretofore stated.

I claim—

In a hitch for connecting trailers and tractors, a frame comprising a plate having right angled ends, a pair of parallel plates connected to opposite sides of the right angled ends, a coupling bar having its end disposed between the parallel plates, a head formed on one end of the coupling bar and having portions thereon contacting with the parallel plates, journal bearings, a pair of spaced brackets comprising divergent arms on the frame for supporting the journal bearings, a shaft rotatable in the bearings, a pulley on the shaft, sheave pulleys rotatably mounted on the frame, a flexible member wound around said pulley, and embracing the sheave pulleys, said flexible means having connection with the coupling bar, and a hand wheel for operating the shaft.

JOHN F. WINGERT, JR.